(12) United States Patent
Vitale et al.

(10) Patent No.: US 11,001,309 B2
(45) Date of Patent: May 11, 2021

(54) INSTRUMENT PANEL WITH REINFORCEMENT MEMBER

(71) Applicant: FAURECIA INTERIOR SYSTEMS, INC., Auburn Hills, MI (US)

(72) Inventors: Peter Vitale, Windsor (CA); Curtis Wright, Royal Oak, MI (US); Louis Thomas, Santa Clara, CA (US)

(73) Assignee: FAURECIA INTERIOR SYSTEMS, INC.

( * ) Notice: Subject to any disclaimer, the term of this patent is extended or adjusted under 35 U.S.C. 154(b) by 119 days.

(21) Appl. No.: 16/377,436

(22) Filed: Apr. 8, 2019

(65) Prior Publication Data

US 2020/0317275 A1    Oct. 8, 2020

(51) Int. Cl.
| | |
|---|---|
| *B62D 25/14* | (2006.01) |
| *B29C 44/12* | (2006.01) |
| *B29C 44/58* | (2006.01) |
| *B29L 31/30* | (2006.01) |

(52) U.S. Cl.
CPC ............ *B62D 25/14* (2013.01); *B29C 44/128* (2013.01); *B29C 44/1266* (2013.01); *B29C 44/588* (2013.01); *B29L 2031/3008* (2013.01)

(58) Field of Classification Search
CPC ... B62D 25/14; B29C 44/1266; B29C 44/588; B29C 44/128; B29L 2031/3008
See application file for complete search history.

(56) References Cited

U.S. PATENT DOCUMENTS

| | | | |
|---|---|---|---|
| 8,919,845 B2 | 12/2014 | Teichmann et al. | |
| 9,278,500 B2 | 3/2016 | Filipp | |
| 2006/0029789 A1 | 2/2006 | Donatti et al. | |
| 2010/0183841 A1* | 7/2010 | Mally | B29C 44/1257 428/138 |

FOREIGN PATENT DOCUMENTS

| | | |
|---|---|---|
| FR | 3005619 A1 | 11/2014 |
| JP | H10211832 A | 8/1998 |
| JP | 4900689 B2 | 5/2008 |

\* cited by examiner

*Primary Examiner* — D Glenn Dayoan
*Assistant Examiner* — Melissa Ann Bonifazi
(74) *Attorney, Agent, or Firm* — Carlson, Gaskey & Olds, P.C.

(57) ABSTRACT

A method and apparatus includes a substrate, a foam that is applied to the substrate to form a least a portion of an interior trim part, at least one holder fixed to the substrate, and at least one reinforcement member supported by the at least one holder such that, when the foam is applied, the at least one reinforcement member is suspended within the foam.

20 Claims, 4 Drawing Sheets

INSTRUMENT PANEL WITH REINFORCEMENT MEMBER

TECHNICAL FIELD

The subject disclosure generally relates to an instrument panel with a reinforcement member that is suspended in foam.

BACKGROUND OF THE INVENTION

Instrument panels traditionally include a substrate layer, a foam layer, and an outer skin that forms an external surface of the instrument panel. In some configurations, a reinforcement structure is positioned within the foam to provide increased rigidity. In one example, a wire reinforcement is positioned on an internal side of the outer skin after the outer skin is placed in a mold. When foam is introduced into the mold, the wire reinforcement member can be pushed against the outer skin such that the wire profile can be seen or read through the external surface of the outer skin. This provides an unpleasing aesthetic appearance for the instrument panel and leads to an increase in scrap.

SUMMARY OF THE INVENTION

In one exemplary embodiment, an apparatus includes a substrate, a foam that is applied to the substrate to form a least a portion of an interior trim part, at least one holder fixed to the substrate, and at least one reinforcement member supported by the at least one holder such that, when the foam is applied, the at least one reinforcement member is suspended within the foam.

In another embodiment according to the previous embodiment, the at least one reinforcement member comprises at least one tube.

In another embodiment according to any of the previous embodiments, the at least one tube includes a hollow center through which gas vents when the foam is applied to the substrate.

In another embodiment according to any of the previous embodiments, the at least one tube is positioned within the foam to extend along a brow of the interior trim part.

In another embodiment according to any of the previous embodiments, the at least one reinforcement member comprises a plurality of wires and/or tubes.

In another embodiment according to any of the previous embodiments, the at least one holder comprises at least one clip.

In another embodiment according to any of the previous embodiments, the at least one clip includes a connector end that is fixed to the substrate and a grip end that receives the at least one reinforcement member.

In another embodiment according to any of the previous embodiments, the apparatus includes a skin that covers the foam to form an exterior surface of the interior trim part, and wherein the at least one reinforcement member is spaced apart from the skin and the substrate once suspended in the foam.

In another exemplary embodiment, an interior trim part includes a substrate, a foam that is applied to the substrate, at least one clip fixed to the substrate, at least one reinforcement member supported by the at least one clip such that the at least one reinforcement member is suspended within the foam, and a skin layer that covers the foam to form an exterior surface of the interior trim part.

In another embodiment according to any of the previous embodiments, the at least one reinforcement member comprises at least one tube that includes a hollow center through which gas vents when foam is applied to the substrate.

In another embodiment according to any of the previous embodiments, the at least one tube is positioned within the foam to extend along a brow of the interior trim part.

In another exemplary embodiment, a method includes attaching at least one holder to a substrate, supporting at least one reinforcement member with the at least one holder, positioning a layer of skin apart from the substrate and the at least one reinforcement member to define an open cavity between the layer of skin and the substrate, and introducing foam to fill the open cavity such that the at least one reinforcement member is suspended within the foam to form a least a portion of an interior trim part.

In another embodiment according to any of the previous embodiments, the at least one reinforcement member comprises at least one tube that includes a hollow center, and the method further includes venting gas through the hollow center when the foam is introduced into the hollow cavity.

In another embodiment according to any of the previous embodiments, the method further includes positioning the at least one reinforcement member within the open cavity to extend along a brow of the interior trim part.

In another embodiment according to any of the previous embodiments, the at least one reinforcement member comprises at least one wire and/or tube, and wherein the at least one holder comprises a clip, and including connecting a connector end of the clip to the substrate, and supporting the at least one wire and/or tube with a grip end of the clip.

These and other features may be best understood from the following drawings and specification.

DETAILED DESCRIPTION

Figure 1:
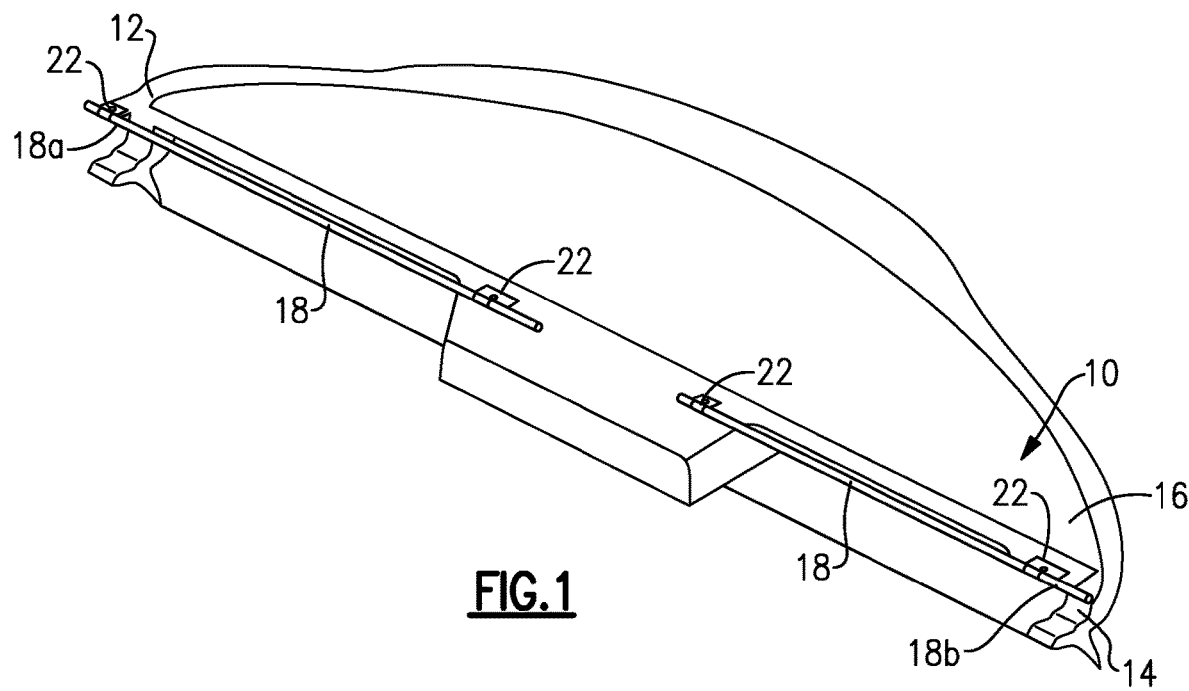
FIG. 1 is a front view of an instrument panel incorporating reinforcement members according to the subject invention.
Figure 2:
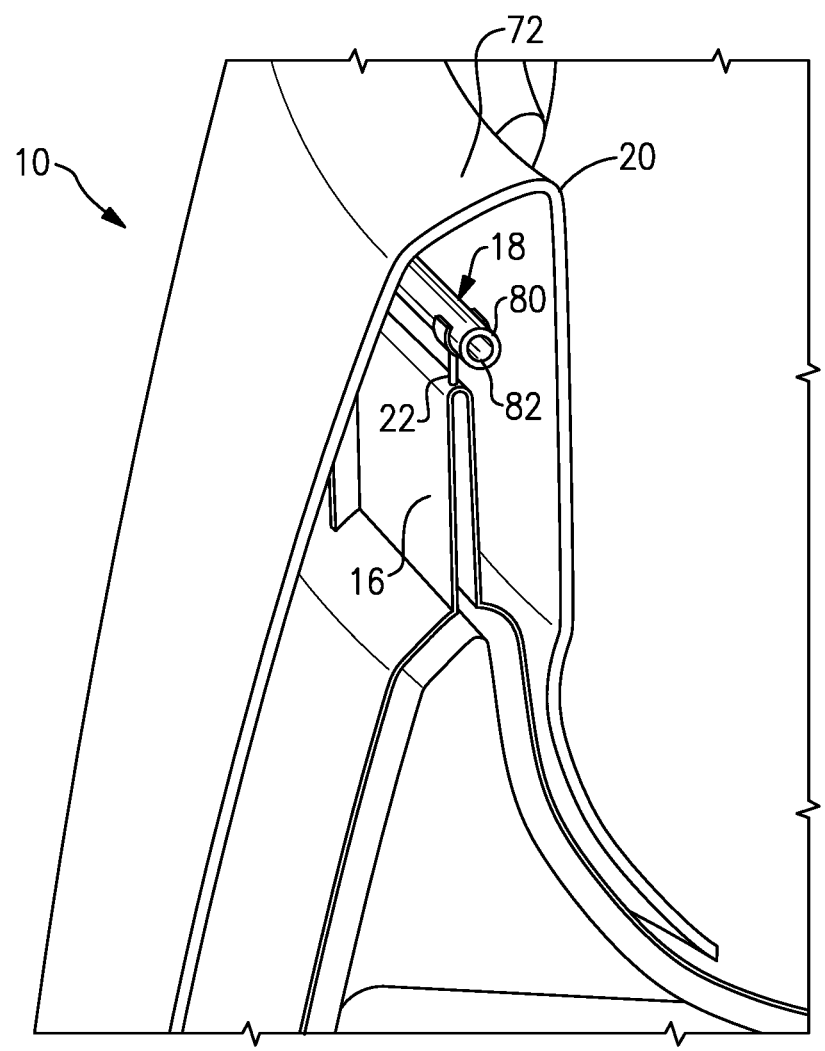
FIG. 2 is a section view of an instrument panel and reinforcement member.

FIG. 1 shows an interior trim part, such as an instrument panel 10 for example, for a vehicle that extends from a first end 12 to a second end 14. The instrument panel 10 includes a substrate 16 and one or more internal reinforcement members 18 that are used to provide structure for the instrument panel 10 and to increase rigidity. In one example, the reinforcement members 18 are positioned to extend along a brow 20 of the instrument panel 10 as shown in FIG. 2. In the example shown in FIG. 1, there is a first reinforcement member 18a that extends along one half of the instrument panel 10 and a second reinforcement member 18b that extends along the other half of the instrument panel 10. A single reinforcement member or additional reinforcement members could also be used as alternatives. Further, while the reinforcement members 18 are disclosed in the example component of an instrument panel, it should be understood that the reinforcement members could be used within other interior trim components.

Figure 3:
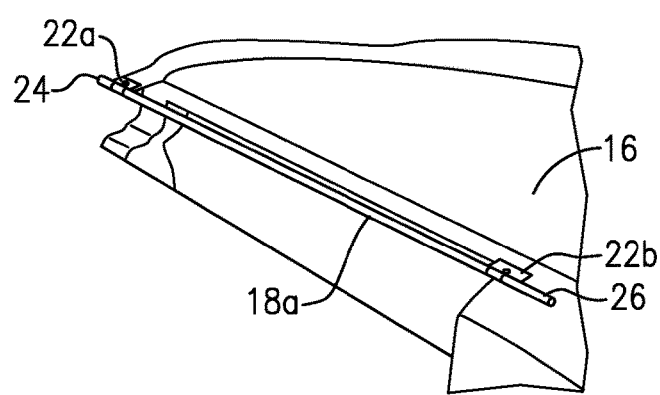
FIG. 3 is a perspective view of one portion of the instrument panel of FIG. 1 and shows one example embodiment where a reinforcement member is clipped to a substrate.

One or more holders 22 are fixed to the substrate 16 to support the reinforcement members 18. In the example shown in FIG. 1, two holders 22 are used to support each reinforcement member 18a, 18b. Fewer or additional holders 22 could be utilized depending on the size of the panel 10 and/or available packaging space. As best shown in FIG. 3, a first holder 22a is used to support a first end 24 of the first reinforcement member 18a and a second holder 22b is used to support a second end portion 26 of the first reinforcement member 18a. The holders 22a, 22b hold the reinforcement member 18a suspended relative to, i.e., spaced apart from, the substrate 16.

Figure 4:
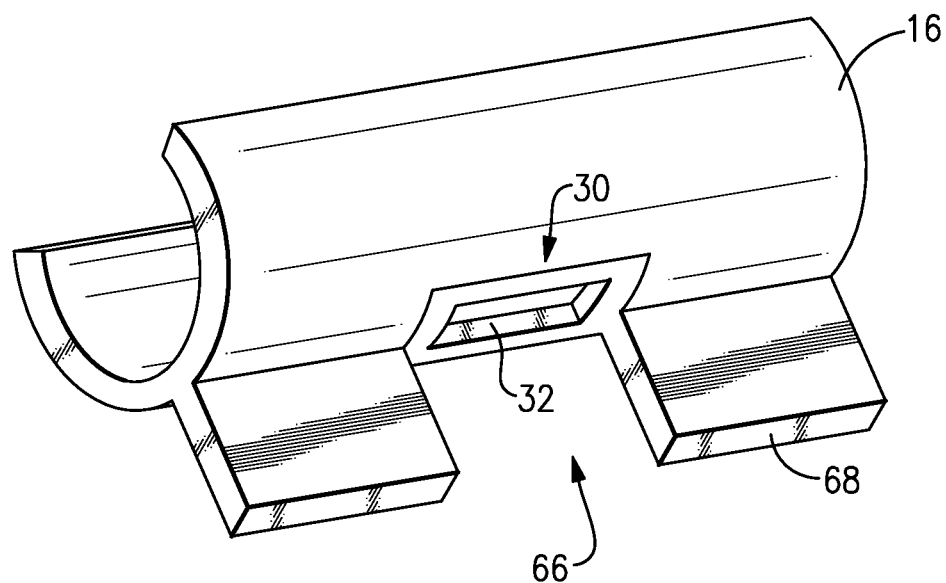
FIG. 4 is a perspective view of one example of a substrate attachment interface configured to receive a holder for the reinforcement member.
Figure 5:
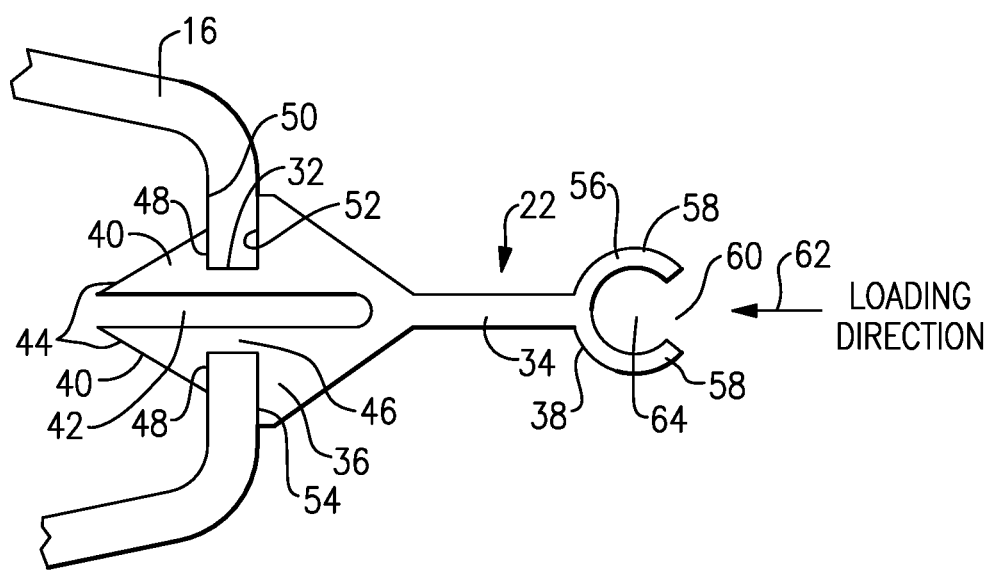
FIG. 5 is a schematic view of an example of the holder that is received within the substrate attachment interface.

As shown in FIGS. 4-5, the substrate 16 includes a connection interface 30 that is configured to receive the holder 22. In one example, the connection interface 30 comprises an opening or aperture 32 in the substrate 16 and the holder 22 comprises a clip 34. The clip 34 includes a connector end 36 that is fixed to the substrate 16 and a grip end 38 that receives the reinforcement member 18. In one example, the connector end 36 includes at least two legs 40 that are spaced apart from each other by a gap 42. The legs 40 include a tapered outer surface 44 such that the legs 40 widen in thickness in a direction extending away from the gap 42. The tapered outer surfaces 44 of the legs 40 facilitate insertion of the clip 34 through the aperture 32. Each leg 40 includes a narrowing portion 46 axially spaced from a distal edge of the connector end 36 to provide a retention shoulder 48. The legs 40 are configured such that as the tapered surfaces 44 engage the aperture 32 of the substrate 16, the legs 40 compress towards each other such that the connector end 36 can be inserted through the aperture 32 and then the legs 40 resiliently spring away from each other such that the retention shoulder 48 positively seats the clip 34 against a rear surface 50 of the substrate 16. The clip 34 may also include a forward retention shoulder 52 that engages a front surface 54 of the substrate 16.

In one example, the grip end 38 of the clip 34 comprises a curved receptacle portion 56 with opposing arms 58 having distal ends that are separated from each other by a gap 60. In one example, the arms 58 comprise a C-shape that is configured to grip an outer surface of the reinforcement member 18. The arms 58 define an internal diameter that is generally equal to or slightly varies from an outer diameter of the reinforcement member 18. To install the reinforcement member 18 into the holders 22, the reinforcement member 18 is pressed into the gap 60 via a loading direction 62 as indicated in FIG. 5. During insertion, the arms 58 move away from each other such that the reinforcement member 18 can be positioned within an open area 64 between the arms 58. Once one side of the reinforcement member 18 is located within the open area 64, the arms 58 rebound toward each other to hold or grip an opposing side of the reinforcement member 18. The internal diameter of the arms 58 should be sufficiently sized relative to the outer diameter of the reinforcement member 18 such that the reinforcement member 18 cannot be easily released from the grip end 38 of the reinforcement member 18. It should be understood that the clip 34 shown in FIGS. 4-5 is just one example of a clip that can be used to hold the reinforcement member 18 in place, and that other types of clips and/or holders can be used to hold the reinforcement members 18 fixed relative to the substrate 16.

In one example, the substrate 16 can include cut-outs or notches 66 (FIG. 4) that are provided for the apertures 32. The notches 66 are formed an inwardly facing edge 68 of the substrate 16.

Figure 6:
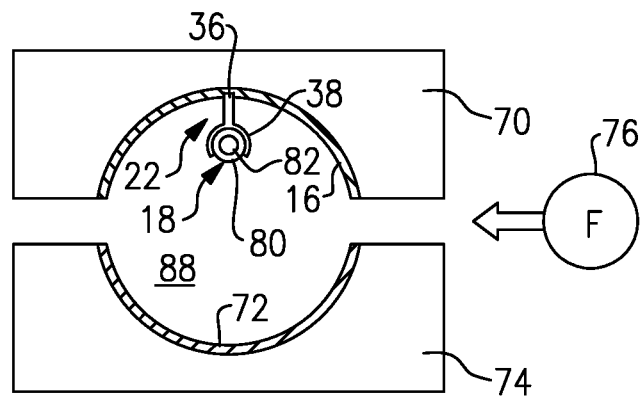
FIG. 6 is a schematic view of an example of a mold that is used to make the instrument panel.
Figure 7:
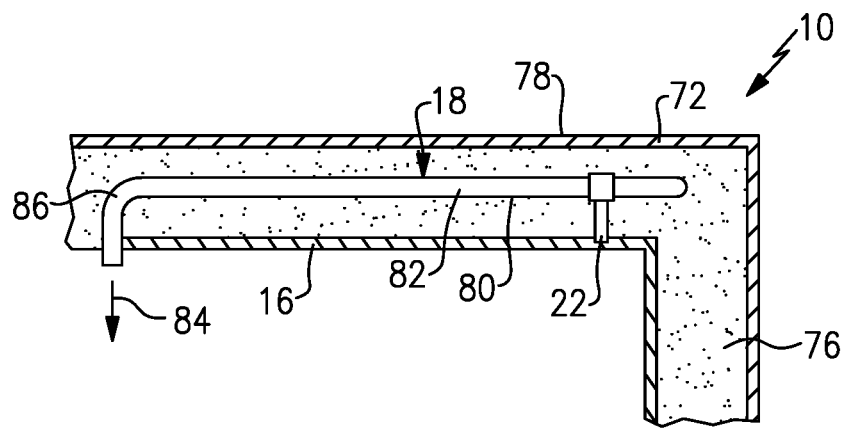
FIG. 7 is a schematic view of an example of a reinforcement member suspended within foam to form at least a portion of the instrument panel.

Once the reinforcement member 18 has been secured to the substrate 16 with a clip 34, the assembly is placed in a first portion 70 of a mold as shown in FIG. 6. An outer skin 72 or layer of skin material is positioned against a second portion 74 of the mold. Foam 76 is then introduced into the mold between the substrate 16 and outer skin 72 to form a least a portion of the instrument panel 10. The outer skin 72 forms an exterior surface 78 of the instrument panel 10 as shown in FIG. 7. The reinforcement member 18 is supported by the holder 22 during the molding process such that the reinforcement member 18 is suspended within the foam 76 and is held in a fixed position relative to the substrate 16 and the outer skin 72. In one example, the reinforcement member is spaced apart from both the substrate 16 and the outer skin 72 when suspended within the foam 76. Further, the holders 22 keep the reinforcement member 18 from moving relative to the outer skin 72 during the foaming process such that the reinforcement member 18 cannot contact or be forced against the outer skin 72. This reduces read through of the reinforcement member 18 and thus prevents scrap.

The least one reinforcement member 18 can comprise a plurality of wires and/or tubes. The wires and/or tubes provide structure to the brow 20 of the instrument panel, and well as providing a desired amount of rigidity/stiffness for the brow 20. In one example, the reinforcement member 18 comprises a tube 80 that includes a hollow center 82. The benefit of using a tube 80 with a hollow center 82 is that gas can be vented to atmosphere, as indicated at 84 in FIG. 7, when the foam 76 is introduced during the molding process. Being able to vent gases reduces the possibility of voids being formed within the foam layer of the panel.

In one example, the substrate 16 can be an injection molded component made from glass-filled polypropylene or any suitable material with sufficient rigidity to support the foam 76, holders 22, reinforcement members 18, outer skin 72, etc. The reinforcement members 18 can be made from a metal or plastic material, for example. The foam 76 can comprise any type of polyurethane foam or other suitable foam material that provides a desired stiffness and/or or compressibility. The outer skin 72 can comprise any suitable decorative material for an instrument panel 10 such as PVC, polyolefin, polyurethane, etc.

One example method of making the instrument panel 10 includes attaching at least one holder 22 to the substrate 16 and supporting at least one reinforcement member 18 with the holder 22. This assembly is placed in the first portion 70 of the mold and can be held in place using a vacuum force or pneumatic pins (not shown), for example. The method further includes positioning the outer skin 72 in the second portion 74 of the mold such that the outer skin 72 is spaced apart from the substrate 16 and the reinforcement member 18 to define an open cavity 88 between the outer skin 72 and the substrate 16. Then, the foam 76 is introduced to fill the open cavity 88 such that the reinforcement member 18 is suspended within the foam 76 to form a least a portion of the instrument panel 10.

In one example, the reinforcement member 18 comprises at least one tube 80 and the method includes venting gas through the hollow center 82 when the foam 76 is introduced into the hollow cavity 88. In one example, the tube 80 includes one or more bends 86 to facilitate venting as needed.

In one example, the reinforcement member 18 is positioned within the open cavity 88 to extend along the brow 20 of the instrument panel 10.

In one example, the holder 22 comprises a clip 34 and the method includes connecting the connector end 36 of the clip 34 to the substrate 16 and supporting the reinforcement member 18 with the grip end 38 of the clip 34.

The subject invention provides an instrument panel with a reinforcement member that is suspended in foam to provide desired structure and stiffness to a brow of the panel. By using a suspended reinforcement member, read through and therefore scrap are eliminated, and cycle time is reduced. Further, venting of gas is accomplished through the hollow center of the tubes which reduces voids being formed within the foam layer of the panel.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An apparatus comprising:
   a substrate:
   a foam that is applied to the substrate to form a least a portion of an interior trim part;
   at least one holder fixed to the substrate; and
   at least one reinforcement member supported by the at least one holder such that, when the foam is applied, the at least one reinforcement member is suspended within the foam.

2. The apparatus according to claim 1, wherein the at least one reinforcement member comprises at least one tube.

3. The apparatus according to claim 2, wherein the at least one tube includes a hollow center through which gas vents when the foam is applied to the substrate.

4. The apparatus according to claim 2, wherein the at least one tube is positioned within the foam to extend along a brow of the interior trim part.

5. The apparatus according to claim 1, wherein the at least one reinforcement member comprises a plurality of wires and/or tubes.

6. The apparatus according to claim 1, wherein the at least one holder comprises at least one clip.

7. The apparatus according to claim 6, wherein the at least one clip includes a connector end that is fixed to the substrate and a grip end that receives the at least one reinforcement member.

8. The apparatus according to claim 1, including a skin that covers the foam to form an exterior surface of the interior trim part, and wherein the at least one reinforcement member is spaced apart from the skin and the substrate once suspended in the foam.

9. An interior trim part comprising:
   a substrate:
   a foam that is applied to the substrate;
   at least one clip fixed to the substrate;
   at least one reinforcement member supported by the at least one clip such that the at least one reinforcement member is suspended within the foam; and
   a skin layer that covers the foam to form an exterior surface of the interior trim part.

10. The interior trim part according to claim 9, wherein the at least one reinforcement member comprises at least one tube that includes a hollow center through which gas vents when foam is applied to the substrate.

11. The interior trim part according to claim 10, wherein the at least one tube is positioned within the foam to extend along a brow of the interior trim part.

12. A method comprising;
    attaching at least one holder to a substrate;
    supporting at least one reinforcement member with the at least one holder;
    positioning a layer of skin apart from the substrate and the at least one reinforcement member to define an open cavity between the layer of skin and the substrate; and
    introducing foam to fill the open cavity such that the at least one reinforcement member is suspended within the foam to form a least a portion of an interior trim part.

13. The method according to claim 12, wherein the at least one reinforcement member comprises at least one tube that includes a hollow center, and including
    venting gas through the hollow center when the foam is introduced into the hollow cavity.

14. The method according to claim 12, including positioning the at least one reinforcement member within the open cavity to extend along a brow of the interior trim part.

15. The method according to claim 12, wherein the at least one reinforcement member comprises at least one wire and/or tube, and wherein the at least one holder comprises a clip, and including
    connecting a connector end of the clip to the substrate, and
    supporting the at least one wire and/or tube with a grip end of the clip.

16. The method according to claim 12, including having the at least one holder hold the at least one reinforcement member spaced apart from the substrate.

17. The method according to claim 12, including
    forming an assembly that includes the at least one holder attached to the substrate and the at least one reinforcement member supported by the at least one holder,
    fixing the assembly to a first mold portion, and
    positioning the layer of skin to lay against a mold surface of a second mold portion to define the open cavity between the layer of skin and the substrate.

18. The interior trim part according to claim 9, wherein the at least one clip holds the at least one reinforcement member spaced apart from the substrate.

19. The apparatus according to claim 1, wherein the at least one holder holds the at least one reinforcement member spaced apart from the substrate.

20. The apparatus according to claim 1, wherein at least portions of the at least one reinforcement member and the substrate are separated from each other by the foam.

* * * * *